Patented Sept. 29, 1942

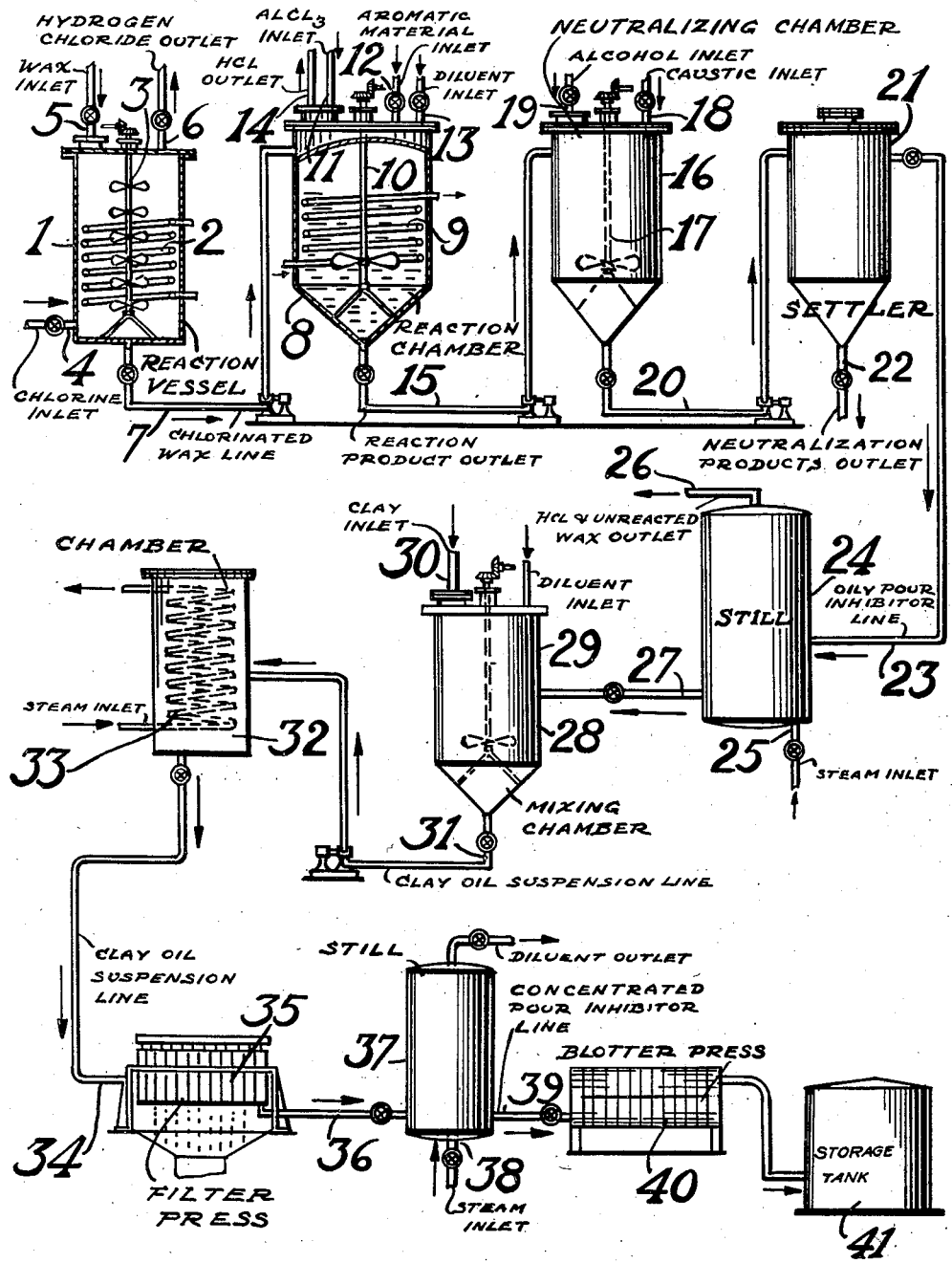

2,297,292

UNITED STATES PATENT OFFICE 2,297,292

PROCESS FOR PRODUCING POUR INHIBITORS FOR WAX CONTAINING OILS

Garland H. B. Davis, Elizabeth, and Charles C. Swoope, Roselle Park, N. J., assignors, by mesne assignments, to Standard Catalytic Company, a corporation of Delaware Application May 26, 1936, Serial No. 81,900

3 Claims. (Cl. 252—59)

The present invention relates to the art of producing oils of low cold test from oils containing waxy hydrocarbons, and more specifically, to an improved method for preparing a pour inhibiting substance which may be added to the wax-containing oils. The invention will be fully understood from the following description:

In a prior patent, U. S. 1,815,022 issued July 14, 1931, a process for producing low cold test oils from wax-containing hydrocarbons is disclosed. In this patent the particular method disclosed comprises the addition to the oil of a small amount of a class of substances comprising low temperature aluminum chloride condensation products of paraffin wax and aromatic hydrocarbons such as naphthalene.

According to the present invention, a pour inhibitor is produced by mixing a chlorinated waxy hydrocarbon, such as chlorinated wax, with an aromatic compound, particularly a polycyclic aromatic hydrocarbon such as naphthalene, bringing the mixture to a temperature suitable for the condensation of these two constituents and adding to the mixture, at spaced intervals, portions of a condensing agent, such as aluminum chloride, while constantly agitating the reaction mixture and maintaining the reaction temperature substantially constant by cooling if necessary. Among the waxy hydrocarbons, the chlorine derivatives of which may be employed, may be mentioned paraffin wax, heavy paraffin oils, petrolatum, montan wax, ozocerite, and similar hydrocarbons of a waxy nature. Among aromatic compounds which may be employed in addition to naphthalene may be mentioned phenols, diphenyl, fluorene, phenanthrene, anthracene, high boiling aromatic petroleum extracts.

If cold initial materials are employed, they are mixed and heated to the reaction temperature in any conventional manner. Practically, the chlorinated waxy material is freshly prepared for this process and is mixed while still hot with an aromatic compound, the heat of the chlorinated wax being utilized to bring the reaction mixture to a condensation temperature. Both of these methods for supplying the heat of reaction are contemplated hereinafter by the expression, "bringing the initial materials to reaction temperature."

It is preferable, according to the present invention, to employ a diluent for the reaction mixture both as a means for insuring more accurate control of the reaction temperature and insuring intimate contact of the reacting materials. A diluent most commonly employed is a petroleum hydrocarbon mixture having a boiling point above the desired reaction temperature and generally having its end point within the kerosene range. In any case, the diluent should be one which has a good solvent power for the condensation product of the chlorinated wax and the aromatic compound whereby the reaction product may be readily recovered from the reaction mixture in a manner hereinafter described.

It is usually desirable to carefully refine the kerosene used as the diluent in order to avoid any reaction between the chlor-paraffin and the diluent. This refinement of the diluent is effected by acid treatment with sulfuric acid or by treatment with aluminum chloride, the undesirable impurities being taken off as a sludge.

Of course, the reaction can be carried out without the use of a diluent. In such case, however, the reaction mixture is not so easily handled and the recovery and refining of the reaction product is rendered more difficult.

The reaction temperature may vary between room temperature and about 200° F. When a diluent is employed, it is preferable to maintain the reaction temperature below about 130° F., preferably below 100° F. and especially at a temperature of about 87° F. In the absence of a diluent, it is generally necessary to employ higher temperatures, probably because of the lower degree of intimacy of admixture of the reactive constituents. In such case, the reaction temperature selected is suitably above about 130° F.

The nature of the product depends not only upon the reaction temperature but upon the content of chlorine in the chlorinated wax, the nature of the aromatic compound, the ratio of aromatic compound to chlorinated wax in the initial mixture and the amount of condensation agent employed. The chlorinated wax should not contain substantially less than 10% of chlorine although amounts as low as 7% may be employed. An increase in the chlorine content of the wax above 13½% gives rise to the formation of products of a rubber-like nature which are generally insoluble in lubricating oil and are unsuitable for the purpose intended. The formation of undesirable products becomes especially pronounced when the chlorine content of the chlorinated wax is 20% or more. Chlorinated waxes containing not more than 20% chlorine and more than 13.5% may be employed, but usually with the result that more unreacted chlorine must be removed from the reaction product and that more careful control of the reaction, so as to avoid the formation of undesirable rubber-like products, is required. It may, therefore, be stated that the use of a chlorinated wax containing more than 15% of chlorine should be avoided and that for best results the chlorinated wax selected should contain between 10 and 13% of chlorine.

The amount of aromatic compound, such as naphthalene, to be employed depends upon the degree of chlorination of the chlorinated wax. With a 10 to 12% chlorinated wax, about 10 parts of naphthalene for every 100 parts of chlorinated wax are employed. With higher chlorinated waxes a higher proportion of naphthalene is preferred. For example, with 100 parts of a 20% chlorinated wax about 15 parts of naphthalene should be employed. When only 10 parts of naphthalene are employed with a wax containing about 15% of chlorine, the resulting reaction product contains more chlorine than is the case when 10 parts of naphthalene is reacted with a less chlorinated wax, but the refined product obtained in both cases, by distillation and clay treatment of the crude product, contains about the same amount of chlorine, which in each case is a fractional percentage.

When aluminum chloride is employed as a condensing agent, it may be used in any desired amount, ranging from about 2 parts per 100 parts of chlorinated wax to 10 or more parts per 100 parts of chlorinated wax. Obviously, it is desirable to use as little of the aluminum chloride, or other catalyst, as possible. 7½ parts of aluminum chloride for each 100 parts of chlorinated paraffin has been found to be quite satisfactory. Substantially equally satisfactory results have been obtained by the employment of 5 parts of aluminum chloride for each 100 parts of chlorinated paraffin. When quantities approximating or exceeding 10 parts of aluminum chloride per 100 parts of chlorinated paraffin are employed, control of the reaction becomes increasingly difficult and the tendency of the condensation to continue to the formation of undesirable products is enhanced.

As is customary in reactions of this type, the condensing agent should be added slowly and with constant agitation so as to prevent local overheating, making possible a careful control of the reaction temperature and the production of a uniform product. Preferably, the condensing agent is added in aliquot portions at intervals of ¼ or ½ or 1 hour, until the full amount is added.

The most suitable time of reaction cannot be definitely defined by numerical limits since it is dependent upon the various factors discussed and must be determined by experimentation for any given combination of these factors. Generally, it may be stated that the greater the amount of aluminum chloride employed, the shorter will be the time required for completion of the reaction. The completion of the reaction can be readily ascertained by the appearance of a sample of the reaction mass. Prior to completion of the reaction, the reaction mixture has a dark color and is substantially opaque due to the suspension therein of aluminum chloride complexes. As the reaction proceeds, the finely divided particles of aluminum chloride complexes coagulate. When the aluminum chloride sludge settles quite rapidly from a sample of the reaction mixture, leaving a translucent solution, the reaction is substantially complete. Reaction periods from 3 hours to 30 hours have been employed. In general, it may be stated that the reaction period in the absence of a diluent is longer than it is in the presence of a diluent.

Upon completion of the reaction, the sludge is permitted to settle and a clear reaction product is drawn off. If a diluent has been employed, the reaction product is in solution in the diluent. Any acidity in this reaction product is due to hydrochloric acid which may be neutralized by the addition of aqueous or alcoholic caustic. Ordinarily the product is sufficiently neutralized by being washed thoroughly with hot water. The product is then subjected to distillation by the combined action of external heat and injected steam to a bottoms temperature of about 600° F. In this distillation the diluent, unreacted wax and low molecular weight condensation products, any water present, and any residual HCl, either present as such or formed by the splitting off of loosely bound chlorine, are taken off overhead. The residue is preferably contacted with Attapulgus clay, or a similar absorbent material, at a suitable temperature to improve its color and insure complete neutrality, and filtered, the filtrate being the refined pour inhibitor.

It is usually desirable to facilitate the separation of the sludge by the addition of a solvent of the type mentioned above for the condensation product. This diluent is removed in the purifying distillation of the product. This facilitation of sludge separation by the employment of a diluent is best accomplished by adding the diluent to the initial material as described above, whereby the additional advantage of more positive control of the reaction is obtained.

According to a specific modification of the present invention, which is fully described in our copending application, Ser. No. 576,208, filed Nov. 19, 1931 (now Patent No. 2,087,682, granted July 20, 1937) of which the present application is a continuation in part, the process is simplified and the product is improved by maintaining the reaction temperature at all times below about 125° F., preferably below 100° F., a diluent being preferably employed, and by discontinuing the reaction before it reaches its final stage. This specific embodiment is based upon the discovery that the pour inhibiting properties of the product reach an optimum value at a stage of the reaction prior to the completion thereof. While the pour inhibiting potency of the condensation product is not destroyed by permitting the reaction to go to completion, the further chemical change which occurs between the point of optimum pour inhibiting value and completion of the reaction does, in many instances, decrease the pour inhibiting value of the product and detracts from the appearance of the final product.

It has been previously pointed out that prior to the completion of the reaction, the aluminum chloride complexes remain in suspension and settle out with difficulty. This drawback to the improved procedure, according to which the reaction is halted before completion, has been overcome by the discovery that the aluminum chloride sludge may be readily broken out and rendered easily separable by the addition to the reaction mixture of a suitable hydrolytic agent, such as water or alkali, either of which has the power to decompose aluminum chloride and other materials of the same class, such as zinc chloride, iron chloride, and boron fluoride. The products of the hydrolysis, as well as the excess of the hydrolyzing agent, may be readily removed from the oil either by settling or by centrifuging or by any conventional expedient.

The hydrolysis is sometimes accompanied by an undesirable emulsification which aggravates the problem of separation. Such emulsification may be prevented by the addition of 2, 3, 5, or 10% of a water soluble alcohol such as ethyl or isopropyl alcohol or by the addition of sulfonic acids and similar water soluble demulsification agents. Alternatively the hydrolysis may be effected by the employment of alcoholic caustic as the hydrolyzing agent. While caustic soda or sodium carbonate are usually preferred as the hydrolzing agents, other alkalies, such as ammonia, potash, or a slurry of lime may be employed.

The oil after separation thereof from the products of hydrolysis is subjected to a refining treatment similar to that described above. It is to be understood that the clay treatment when employed may be carried out either by agitating the oil with finely divided clay and then filtering, or by percolating the oil through a bed of clay of large particle size.

The point in the reaction at which the hydrolyzing agent is added depends naturally upon the time which would be required for the completion of the reaction, which in turn, as previously pointed out, must ordinarily be determined by a few preliminary experiments and will depend upon the reaction mixture employed, the amount of catalyst employed, and the reaction temperature. It is of course desirable to utilize as much of the chlorparaffin as possible. In general, it may be stated that the best point for the interruption of the reaction is that point at which the content of the chlorparaffin in the reaction mixture is reduced to below 5%, preferably below 1% of the quantity initially employed and before the time when settling of the sludge becomes rapid. The precise point is best determined by ascertaining the point at which the sludge readily coagulates and settles and then selecting the point closest to this easy settling point at which the sludge remains in suspension and settles only slowly.

Another factor to be taken into consideration, and this factor is another norm by which the point at which the reaction is to be interrupted may be determined, is the formation during the condensation of a rubbery solid which is insoluble in all solvents for the active condensation product, and which in the course of the reaction is broken down to oily products. The maximum potency of the condensation product is apparently arrived at at some point during the presence of this insoluble rubber-like solid. For the production of the most potent product, therefore, it is desirable to interrupt the reaction as close as possible to the disappearing point of this insoluble rubber-like material, which, in the majority of cases, is coincidental with the point determined by the test indicated above.

As an illustrative example, a reaction mixture of 100 lbs. of chlorparaffin containing 12 lbs. of chlorine, 10 lbs. of naphthalene and 5 lbs. of aluminum chloride was reacted at 80° F. and the reaction was interrupted at various points ranging from 2 to 10 hours after its beginning. Even at 10 hours the reaction had not reached its final stage; that is, further internal changes would still occur if additional time were provided. Under these conditions, a reaction time of 5 to 6 hours was found to be most satisfactory, at which time the amount of chlorparaffin had been reduced below 5% of its original amount, and the aluminous sludge showed only a slight tendency to settle.

The refined concentrated pour inhibitor obtained by the method hereinbefore described is an oil resembling a heavy lubricating oil and having a green cast and viscosity at 210° F. of upwards of 50 seconds Saybolt, usually above 300 seconds Saybolt, and sometimes as high as 700 seconds Saybolt, and a pour point ranging from 20° F. to 80° F.

The product obtained by the specific embodiment in which the reaction is interrupted before its completion has a better potency and is more easily reproduced than that obtained by permitting the reaction to go substantially to completion without interruption. The product of either method is effective in reducing the pour point of all petroleum oils, the pour points of which are undesirably high due to the presence in the oil of paraffin wax. In their concentrated state the pour inhibitors of the present invention are especially effective in heavy oils such as residuals having a viscosity at 210° of 150 seconds Saybolt and higher. These pour inhibitors, however, find their widest application in motor oils which are normally of much lower viscosity. For this reason, and for the further reason that it is desirable to market a pour inhibitor of uniform potency, the concentrated product being of variable potency, it is generally desirable to adjust the potency of the concentrate to a uniform value which is selected so as to be satisfactory for motor oils by diluting it with a bright stock of good quality.

In the accompanying drawing is shown in diagrammatical form a front elevation, partly in section, of an apparatus suitable for the production of a pour inhibitor according to the present process of the present invention. Referring to the drawing in detail, 1 is a reaction vessel provided with a coil 2, an agitator 3, an inlet 4 for chlorine, an inlet 5 for wax, an outlet 6 for hydrogen chloride, and an outlet 7 for chlorinated wax. This chlorination step is usually conducted at a temperature between about 140° and 300° F. for a period of time sufficient to introduce into the waxy initial material the desired amount of combined chlorine.

The chlorinated wax is discharged from line 7 into a reaction chamber 8 which is provided with a temperature-regulating coil 9 which may be employed for heating or cooling purposes, an agitator 10, an inlet 11 for the condensing agent, an inlet 12 for the aromatic material, an inlet 13 for a diluent, an outlet 14 for hydrogen chloride, and an outlet 15 for the reaction product.

The reaction product is discharged from line 15 into a neutralizing chamber 16 provided with an agitator 17, an inlet for caustic 18, an inlet for alcohol 19, and an outlet 20 for withdrawal of the mixture of oil and neutralization products.

The mixture of oil and neutralization products is discharged from line 20 into a settler 21 provided with an outlet 22 for neutralization products, and line 23 for the withdrawal of the oily pour inhibitor.

The neutralized pour inhibitor is discharged from line 23 into a still 24, heated in any conventional manner, provided with an inlet 25 for steam, an outlet 26 for diluent and unconverted initial material which leaves in the vapor state, an outlet 27 for the withdrawal of concentrated pour inhibitor which is then fed to a mixing chamber 28 provided with an agitator 29, an inlet 30 for clay, and a withdrawal line 31 for the removal of the clay oil suspension which is fed into a chamber 32 provided with a heating coil 33 in which the clay contacting is conducted. This step is usually carried out at an elevated temperature ranging from 250° F. to 350° F.

The resulting clay oil suspension is removed from chamber 32 through line 34 and introduced into a filter 35 which is usually a filter press of known design. The filtered oil then passes through line 36 into a second still 37 provided with a steam inlet 38 and heated in any conventional manner. In this still, the product is reduced to an initial boiling point in excess of 550° F., usually 600° F. or higher. The concentrated pour inhibitor is then removed from still 37 through line 39 and is preferably passed through a blotter press 40 to storage tank 41.

It is to be understood that the clay treatment may be entirely omitted or may be conducted at normal room temperature by percolating the oil through a bed of course clay. When this procedure is adopted, the filtering operations can be dispensed with.

A better understanding of the process of the present invention may be gathered from the following specific examples which are included for purposes of illustration only, and in which the parts given are by weight.

*Example 1*

Paraffin wax is chlorinated for 8 hours at 200° F. whereby 11.2% of chlorine is introduced into the wax molecule. 100 parts by weight of this chlorinated wax (638 gal.) are mixed with 15 parts by weight of naphthalene (620 lbs.) and the mixture diluted with 525 gallons of refined kerosene. The reaction mixture is brought to a temperature of 86° F. and 2½ parts by weight of aluminum chloride, (105 lbs.), are added in the course of 2 hours, any rise in temperature due to the addition of aluminum chloride being counteracted by cooling.

After the aluminum chloride is fully added, the reaction mixture is maintained at 86° F. for 3½ hours, after which it is mixed with 125 gallons of caustic soda, 22° Bé., and 40 gallons of an alcohol such as isopropyl alcohol. The mixture is thoroughly agitated and is then allowed to settle, the lower layer containing the products of neutralization being drawn off. The oily layer is then reduced in an externally heated still into which steam is injected. The temperature of the still is slowly brought up to 575° F. at which it is maintained for about 11 hours, the unconverted initial material and diluent being taken off overhead.

The concentrated pour inhibitor is then contacted with clay for which purpose it may again be diluted with kerosene to form a solution containing 1 part of pour inhibitor and 3 parts of kerosene. To such a solution, finely divided attapulgus clay is added in amount of 2.5 lbs. per gallon or Tonsil clay is added in an amount of 0.45 lb. per gallon. The clay oil mixture is thoroughly agitated and is then heated for 4 hours at about 315° F., after which the clay is separated from the oil by filtration and the diluent is removed by distillation.

The pour inhibitor so obtained is a viscous material having a green cast, a pour point of 60° F., a gravity of 24.1 A. P. I., and a viscosity at 210° F. of 360 seconds Saybolt. A blend of 30% of this product with 70% of bright stock gave a pour inhibitor fluid having a pour point of 10° F., a gravity of 25.5, a flash of 535° F. and a viscosity at 210° F. of 185 seconds Saybolt, and a viscosity at 100° F. of 2925 sec.

1% of concentrated inhibitor reduced the pour point of a given oil to −30° F., whereas 1% of the blend reduced the pour point of the same oil to 0° F.

*Example 2*

100 parts of chlorinated paraffin wax is prepared by passing chlorine through melted wax which contains less than 2% of oil. At the end of about 20 hours the wax has taken up about 12% of chlorine. To this 100 parts of chlorinated wax, 15 parts of naphthalene are added and the mixture is brought into solution by the addition of 175 parts of a good grade of kerosene. The reaction mixture is brought to a temperature of about 85° F. 3½ parts of anhydrous aluminum chloride are slowly added while the mixture is thoroughly agitated and the temperature is held at about 85° F. After 2½ hours, an aliquot part is removed and mixed with aqueous caustic soda to which about 3% of isopropyl alcohol has been added. This sample contains 20% of its original content of chlorparaffin.

The sample is finished by removing the soda solution, washing the oil with water, distilling off unreacted wax, contacting with clay, and distilling off the diluent. 1% of the oily product reduced the pour point of a Manchester spindle oil from 35° F. to 20° F.

The reaction is continued for 5½ hours longer and a second sample is withdrawn and purified in the manner above described. The content of chlorparaffin in this sample is practically negligible, being below about 1% of the original content. The sludge contained in the sample is non-settling. 1% of this sample after refinement reduced the pour point of the same spindle oil to −5° F.

Samples taken later in the reaction contained a sludge which settled readily. Such samples were less potent pour inhibitors.

*Example 3*

A pour inhibitor was prepared by condensing 100 grams of chlorparaffin with 15 grams of naphthalene diluted with 150 grams of kerosene. The reaction mixture was brought to 80° F. and 1 gram of aluminum chloride was gradually added in the course of about an hour. A second gram of aluminum chloride was added in the course of the next hour. A third gram of aluminum chloride was added in the course of the next hour. The reaction mixture was continuously agitated and maintained at a temperature of approximately 80° F. The reaction was continued for 3 more hours when a mixture of caustic soda and isopropyl alcohol was added. The resulting product was filtered and the oil recovered was reduced with steam and fire at a temperature up to 600° F., leaving as a residue 56 grams of a condensation product.

A second pour inhibitor was prepared as follows. Chlorine was passed through an alundum thimble into an agitated mass of high-melting point petrolatum at a temperature ranging from 180° to 220° F. for approximately 5½ hours until the petrolatum combined with 11% of chlorine. A mixture of 120 grams of the chlorinated petrolatum, 18 grams of naphthalene, and 100 grams of kerosene was brought to a temperature of 86° F. and 3 grams of aluminum chloride were slowly added with constant agitation. After 3¾ hours, a mixture of caustic soda and isopropyl alcohol was added and the product was finished in the manner described above. 82 grams of condensation product were obtained.

A third pour inhibitor was prepared as follows. Palembang wax having a melting point of 140° F. at 200° F. was chlorinated until it took up 12.35% of chlorine. A mixture of 120 grams of the chlorinated wax, with 18 grams of naphthalene and 120 grams of kerosene, was brought to a temperature of 85° F. and 3 grams of aluminum chloride were slowly added with constant agitation. After a reaction period of 4 hours a mixture of caustic soda and isopropyl alcohol was added to the reaction mixture and the condensation product was recovered and finished in the manner before described.

The effect of these three inhibitors on three different types of oils was investigated. The first oil was a Pennsylvania oil having a viscosity of 65 seconds Saybolt at 210° F. and a pour point of +30° F. The second was a Pennsylvania bright stock having a viscosity of 150 seconds at 210° F. and having a pour point of +30. The third was a ranger cylinder oil having a viscosity of 130 seconds at 210° F. and having a pour point of +95° F. The following results were observed:

| Pour reducer | Type of wax used | Pennsylvania oil of 65 viscosity at 210 | Pennsylvania bright stock of 150 viscosity at 210 | Ranger cylinder oil of 130 viscosity at 210 |
|---|---|---|---|---|
| No. 1 | Crude scale | 1.0%<br>−10 | 2.0%<br>+10 | 2.0%<br>+90 |
| No. 2 | High melting petrolatum | −10 | 0 | +45 |
| No. 3 | Palembang of 140° M. P | | 0 | +15 |

Example 4

911 grams of chlorparaffin containing about 20% of chlorine are mixed with 150 grams of naphthalene and 42 grams of MgO and the mixture is diluted with about ⅓ its volume of kerosene. The mixture is heated to 130° F. and 91 grams of $AlCl_3$ are added over a period of 4 hours with constant agitation, the temperature being maintained at about 130° F. The agitation and the heating at 130° F. are continued for 6 hours after the addition of all of the $AlCl_3$ and the temperature is then raised to 150° F., at which point it is maintained for 8 hours with constant agitation. The product is neutralized and finished in the manner described above.

1% of the concentrated product so produced reduced the pour point of an oil having a pour point of 30° F. to 15° F. 5% of the concentrated product reduced the pour point of the same oil to 10° F.

Example 5

10 lbs. of hot, freshly-prepared chlorparaffin containing about 9.6% of chlorine are mixed with 2 lbs. of naphthalene and 10 liters of kerosene. The resulting mixture has a temperature of about 90° F. The mixture is strongly agitated and ½ lb. of aluminum chloride is added in aliquot amounts of 8/5 of an ounce at hourly intervals, the temperature being held below 110° F. The mixture is then heated with agitation for 4 more hours and the sludge is permitted to settle. The oil is drawn off and treated with 15 lbs. of 98% $H_2SO_4$ per barrel. The resulting oil is then filtered and reduced to a flash point of 600° F.

The concentrated product so produced has a viscosity at 210° F. of 347 seconds Saybolt and at 100° F. of 6758 seconds, a viscosity index of 110, a pour point of 45° F. and contains 0.042% of chlorine. 1% of this product in Pennsylvania medium oil, having a pour point of 30° F., reduced the pour point to less than −10° F. 1% of the concentrated product in Pennsylvania heavy oil, having a pour point of 40° F., reduced the pour point to less than −5° F.

Example 6

23 lbs. and 10 ounces of chlorparaffin containing 13.2% of chlorine are mixed with 4 lbs. and 10 ounces of naphthalene and the mixture is brought to a temperature of about 104° F. At this temperature, 20 grams of aluminum chloride are added. The mixture is violently agitated and aluminum chloride is added hourly in doses of 20 grams, the temperature not being permitted to rise above 140° F. After 2 lbs. and 6 ounces of aluminum chloride have been added, the heating is continued at a temperature between 120° F. and 135° F. for 3 hours. The temperature is then raised to 195° F., at which it is maintained for about 6 hours with constant agitation. The reaction mixture is then diluted with water, whereby the sludge is precipitated and the recovered oil is finished in the manner described above.

The concentrated product so obtained has a viscosity at 210° F. of 457.7 seconds, a flash of 580° F. and a pour point of 45° F. 5% of this concentrate in a Pennsylvania medium oil, having a pour point of 30° F., reduced the pour point to less than −10° F. 1% reduced the pour point of the same oil to less than −5° F. 5% of the concentrate in a Pennsylvania heavy oil, having a pour point of 35° F., reduced the pour point to less than 0° F. 1% of the concentrated reduced the pour point of the same oil to 15° F.

Example 7

1359 grams of chlorparaffin containing 10.7% of chlorine are mixed with 272 grams of naphthalene and the mixture is heated to 150° F. 10 grams of aluminum chloride are added and the mixture is constantly agitated. Repeated doses of the same size of aluminum chloride are added hourly until 136 grams of aluminum chloride have been added, the agitation being continued and the temperature being maintained between 150° and 170° F. After the reaction has proceeded for about 13 hours, the temperature is raised to about 200° F. and maintained at this point with constant agitation for about 6 hours. Hot water is added and the oily product is recovered and finished in the manner previously described.

The concentrated product has a viscosity at 210° F. of 369.5 and at 100° F. of 2884, and a pour point of 80° F. It is dark in color and has a brownish-green bloom. 5% of the concentrate in a Pennsylvania medium oil reduced the pour point from 30° F. to less than 5° F. 1% caused a similar reduction.

Example 8

The operation described in Example 7 is repeated while maintaining the temperature during the 13 hours within which the aluminum chloride is added at 175° F. The product so obtained has a viscosity at 210° F. of 447 seconds, and at 100° F. of 3810 seconds, a pour point of 65° F. and was similar in appearance to the product of the preceding example. 5% of this product reduced the pour point of the Pennsylvania medium oil from 30° F. to less than −5° F. 1% reduced the pour point of this oil to 5° F.

Example 9

The procedure described in Example 7 is repeated with the difference that during the addition of aluminum chloride, the temperature is maintained at 125° F. The product so obtained has an appearance similar to that obtained in Example 7 and has a viscosity at 210° F. of 500 seconds Saybolt and at 100° F. of 4223 seconds, a flash point of 625° F. and a pour point of 70° F. 5% of this product reduced the pour point of a Pennsylvania medium oil from 30° F. to 0° F. 1% reduced the pour point of this oil to 5° F.

Example 10

The procedure of Example 9 is repeated with the exception that the reaction mixture is diluted with 1 liter of kerosene. The product so obtained has a viscosity at 210° F. of 306 seconds Saybolt and at 100° F. of 2746 seconds Saybolt and a pour point of 75° F. 5% of this product reduced the pour point of a Pennsylvania medium oil from 30° F. to less than 0° F.

Example 11

22 lbs. and 10 ounces of chlorparaffin containing 9.9% of chlorine are mixed with 4 lbs. of tetralene and the mixture is heated to 100° F. with thorough agitation. 2 lbs. and 3 ounces of aluminum chloride are added in doses of 25 grams hourly, the temperature being held below 125° F. and the mixture being constantly agitated. At the end of 18 hours, the temperature is permitted to rise to 195° F. and maintained at this degree for about 6 hours. The settling of the sludge is affected by the addition of water and the oil recovered is finished in the manner previously described.

The concentrated product has a viscosity at 210° F. of 250.6 seconds, a flash of 550° F. and a pour point of 70°. 5% of the product reduced the pour point of a Pennsylvania medium oil from 30° F. to 10° F. 1% reduced the pour point of this oil to 15° F.

Example 12

6810 grams of chlorparaffin containing 10% of chlorine are mixed with 817 grams of naphthalene and brought to a temperature of 95° F. 680 grams of aluminum chloride are added in doses of 25 grams per hour with constant agitation, the temperature being maintained below 125° F. After the final addition of the aluminum chloride, the reaction mixture is held with constant agitation at a temperature between 125° and 130° F. for 6 hours. 4 liters of kerosene are then added and the sludge is separated. The recovered oil is washed with water and then distilled with fire and steam. The concentrated product has a viscosity at 210° F. of 284 seconds, a flash of 630° F. and a pour point of 80° F. 1% of this product reduced the pour point of a Pennsylvania medium oil from 30° F. to less than 0° F.

Example 13

6810 grams of chlorparaffin containing 8% of chlorine are mixed with 610 grams of tetralene and 204 grams of naphthalene. The mixture is thoroughly agitated and brought to a temperature of 90° F. 680 grams of aluminum chloride are added in equal portions in the course of 10 hours with constant agitation, the reaction temperature being held below 120° F. After the last addition of aluminum chloride, the reaction mixture is held at 125° F. for 4 hours. The concentrated oily product is recovered in the manner described above. This product has a viscosity at 210° F. of 125 seconds Saybolt, a flash point of 535° F. and a pour point of 75° F. 1% of this product reduced the pour point of a Pennsylvania medium oil from 30° F. to less than 0° F.

Example 14

100 parts of chlorparaffin containing 10% of chlorine are mixed with 12 parts of tetralene and diluted with kerosene. The mixture is brought to a temperature of 90° F. The aluminum chloride sludge from a previous run is then added in spaced doses. After all the sludge has been added, 5 parts of aluminum chloride are added in spaced doses, the temperature being maintained between 85 and 90° F. and the mixture being violently agitated. Upon completion of the reaction, the oily product is recovered in the manner before described.

This product has a viscosity at 210° F. of 201.3 seconds, a flash of 530° F. and a pour point of 60° F. 1% of this product reduced the pour point of a Pennsylvania medium oil from 30° F. to 5° F.

Example 15

10 lbs. of chlorparaffin containing 9% of chlorine are mixed with 2.8 lbs. of aromatic extract of a naphthenic lubricating oil. The mixture is diluted with 6 liters of kerosene and brought to a temperature of 90° F. 1.5 lbs. of aluminum chloride are added in 5 equal parts, the temperature not being permitted to rise above 120° F. and the mixture being constantly agitated. The agitation is continued for 2 hours after the addition of the aluminum chloride and the condensation product is recovered in the usual manner.

The product so obtained has a viscosity at 210° F. of 264 seconds, a flash of 635° F. and a pour point of 60° F. 1% of this product reduced the pour point of a Pennsylvania heavy oil from 40° F. to 10° F. 2% reduced the pour point of a Bright Stock, having a pour point of 50° F., to 15° F.

Example 16

10 lbs. of chlorparaffin containing 11% of chlorine are mixed with 2.8 lbs. of a Cycle Stock containing 45% of aromatics. The mixture is diluted with 8 liters of kerosene and brought to a temperature of 100° F. .5 lb. of aluminum chloride are added in 4 equal quantities at hourly intervals, the temperature being held below 120° F. After the last addition of aluminum chloride, the agitation is continued for about 2 hours and the condensation product is recovered in the usual manner.

The product so recovered has a viscosity at 210° F. of 268 seconds, a flash of 565° F. and a pour point of 350° F. 1% of this product reduced the pour point of a Pennsylvania medium oil from 30° F. to less than 0° F. and that of a Pennsylvania heavy oil from 35° F. to 0° F. 2% of this product reduced the pour point of a Bright Stock having a pour point of 50° F. to 15° F.

Example 17

100 parts of chlorparaffin containing 10% of chlorine are mixed with 12 parts of naphthalene and 5 parts of zinc oxide. The mixture is heated to about 140° F. and 10 parts of aluminum chloride are added in equal doses at spaced intervals over a course of about 6 hours. If the reaction mixture becomes too viscous for thorough agitation, it is diluted with kerosene. Upon completion of the reaction, the reaction mixture is diluted with kerosene and the sludge so precipitated is removed and the product is refined in the manner described above.

The product so obtained has a viscosity at 210° F. of 288 seconds, a flash at 615 and a pour point at 80° F. It has a green bloom. 1% of this product reduced the pour point of an oil from 30° F. to less than 0° F.

Example 18

1 part of chlorparaffin containing 12.8% of chlorine is mixed with 10 parts of naphthalene, the mixture diluted with 5 liters of kerosene, and heated with thorough agitation. The sludge from a previous run is added to start the reaction. With the temperature at 105° F., 5 parts of aluminum chloride are added in aliquot portions, the temperature not being permitted to rise above 125° F. and the mixture being constantly agitated. After about 8 hours, a further quantity of kerosene is added and the sludge is permitted to settle. The oil is recovered and refined as above.

1% of the product so obtained reduced the pour point of a Pennsylvania heavy oil from 35° F. to less than 0° F.

Example 19

100 parts of chlorparaffin containing 10% of chlorine are mixed with 9.25 parts of commercial benzol and diluted with 10 liters of kerosene. The mixture is heated to 100° F. and 1 part of aluminum chloride is added, the mixture being constantly agitated. An additional 6.5 parts of aluminum chloride are then added in aliquot portions in the course of 3 hours, the temperature being maintained at about 100° F. At the end of 8 hours, the sludge is permitted to settle and the oil is separated therefrom and treated with 15 lbs. of 98% $H_2SO_4$ per barrel and then with 3 lbs. per gallon of attapulgus clay. The oil is then reduced with fire and steam in the aforesaid manner, the distillation residue being the concentrated pour inhibitor.

Example 20

10 lbs. of chlorparaffin are mixed with 700 grams of anthracene. The mixture is diluted with kerosene and violently agitated. With the temperature at 95° F., a small amount of aluminum chloride is added. Over the course of 6 hours, 1 lb. and 8 ounces of aluminum chloride are added, the temperature being held below 125° F. and the mixture being constantly agitated. At the end of this period, the sludge settles rapidly. The oily product is finished in the manner described above.

This product has pour inhibiting properties inferior to the products produced from naphthalene.

When a more highly chlorinated wax and a larger quantity of aluminum chloride are employed and the reaction is conducted in the absence of a diluent at a higher temperature, such as above 100° F., the crude condensation product is a pitchy material containing a substantial percentage of chlorine, usually in excess of 2%. The crude products, according to the specific examples described, have a better appearance and contain less chlorine, usually not in excess of about 3%. In either case, the subsequent refining steps can be omitted if the appearance of the product is not important, since the chlorine content is not seriously detrimental to the potency of the pour inhibitor. This fact is illustrated by the following tests:

A pour inhibitor obtained by condensing chlorinated wax with naphthalene in the presence of aluminum chloride at a temperature above 130° F., the aluminum chloride having been added slowly with agitation after the other reactants were brought to reaction temperature, had the following characteristics:

| | |
|---|---|
| Gravity | 26.2 |
| Flash ° F | 300 |
| Vis/100° F seconds | 2070 |
| Vis/210° F do | 233 |
| V. I | 125 |
| Carbon | 5.34 |
| Pour ° F | 90 |
| Sulphur | .16 |
| Acid No | .4 |
| Sap. No | 4.3 |
| Color | Dark brown |
| Cast | Brown |
| Appearance | Waxy |

The ultimate analysis of this product was as follows:

| | |
|---|---|
| Carbon | 84.12 |
| Hydrogen | 12.74 |
| Chlorine | 2.40 |
| Sulphur | .16 |
| Ash | .16 |

This crude product was subjected to the refining treatment described, that is, it was stripped with fire and steam to a bottoms temperature of 600° F. and was contacted with attapulgus clay and filtered. The filtrate was dark in color but had a green cast. The chlorine content in the filtrate was 0.48%. The pour inhibitor power of the crude product containing 2.5% of chlorine was compared with that of the refined product containing 0.48% of chlorine in a spindle oil having a pour point of 30° F. with the following results:

| | Pour °F. |
|---|---|
| Spindle oil | 30 |
| Spindle oil+0.5% crude inhibitor | −25 |
| Spindle oil+1.0% crude inhibitor | −35 |
| Spindle oil+0.5% refined inhibitor | −30 |
| Spindle oil+1.0% refined inhibitor | −35 |

It is to be understood that while the above examples describe the preparation of pour inhibitors from chlorinated paraffin wax and chlorinated petrolatum with selected aromatics, the chlorinated wax may be replaced by any of the other chlorinated waxy materials referred to hereinbefore, and specific aromatics may be replaced by any of the other aromatic compounds hereinbefore mentioned. Moreover, olefines derived from waxy materials by splitting out hydrogen chloride from the chlorinated waxy materials may be used in place of and are the equivalents of said materials. Moreover, the aromatics can be omitted entirely and a pour inhibitor obtained by a condensation or polymerization of the chlorinated waxy material or the olefines. Wherever chlorinated waxy materials are referred to, it is to be understood that other halogenated waxy materials are contemplated.

The nature and objects of the present invention having been thus described and preferred embodiment of the same having been illustrated by specific examples, what is claimed as new and useful and desired to be secured by Letters Patent is:

1. The method of making a pour test depressor which will be effective in heavy oils, which method comprises heating a mixture of a chlorinated wax with naphthalene to reaction temperature, adding aluminum chloride to the heated mixture, agitating the mixture during the addition of the aluminum chloride and separating the resultant pour point depressor from sludge and impurities.

2. The method of making a pour test depressor which will be effective in heavy oils, which method comprises heating a mixture of a chlorinated wax with naphthalene to reaction temperature, adding aluminum chloride to the heated mixture, and agitating the mixture during the addition of the aluminum chloride, whereby condensation occurs through the agency of the aluminum chloride, stopping the reaction before its normal conclusion whereby valuable inhibiting powers are preserved, and separating the resultant pour depressor from sludge and impurities.

3. An improved process for producing valuable pour inhibiting substances comprising the steps of forming a low temperature condensation product of chlorinated paraffin wax on an aromatic hydrocarbon through the agency of aluminum chloride by addition of the aluminum chloride to a mixture of the chlorinated paraffin wax and the aromatic hydrocarbon, stopping the reaction by addition of a hydrolyzing agent after a reaction time of 2 to 10 hours and before the final stage of reaction where pour inhibiting powers are at a substantial maximum, separating the hydrolytic products of the catalyst and recovering the oily product.

GARLAND H. B. DAVIS.
CHARLES C. SWOOPE.